United States Patent
Klawon et al.

(10) Patent No.: US 9,819,216 B2
(45) Date of Patent: Nov. 14, 2017

(54) CHARGING CASE FOR ELECTRONIC DEVICES

(71) Applicant: Nook Digital, LLC, New York, NY (US)

(72) Inventors: David Christopher Klawon, Tucson, AZ (US); William Alan Saperstein, San Carlos, CA (US); Jason Cinge Wong, Millbrae, CA (US)

(73) Assignee: Nook Digital, LLC, New York, NY (US)

(*) Notice: Subject to any disclaimer, the term of this patent is extended or adjusted under 35 U.S.C. 154(b) by 115 days.

(21) Appl. No.: 15/002,578

(22) Filed: Jan. 21, 2016

(65) Prior Publication Data

US 2016/0141910 A1    May 19, 2016

Related U.S. Application Data

(62) Division of application No. 13/941,479, filed on Jul. 13, 2013, now abandoned.

(60) Provisional application No. 61/673,588, filed on Jul. 19, 2012, provisional application No. 61/673,590, filed on Jul. 19, 2012.

(51) Int. Cl.
```
H02J 7/00      (2006.01)
H02J 7/02      (2016.01)
H02J 7/35      (2006.01)
G06F 1/16      (2006.01)
```
(52) U.S. Cl.
CPC .......... *H02J 7/025* (2013.01); *G06F 1/1632* (2013.01); *H02J 7/0042* (2013.01); *H02J 7/0044* (2013.01); *H02J 7/0055* (2013.01); *H02J 7/35* (2013.01); *H02J 2007/0096* (2013.01); *Y02E 10/566* (2013.01)

(58) Field of Classification Search
CPC .... H02J 7/025; H02J 2007/0096; H02J 50/10; H02J 5/005; H02J 50/12; H02J 7/0052; H02J 2007/0062; H02J 50/20
USPC ........................................................ 320/108
See application file for complete search history.

(56) References Cited

U.S. PATENT DOCUMENTS 9,118,195 B2 *  8/2015  Foster .................. H02J 7/0044

* cited by examiner

Primary Examiner — Nghia Doan
(74) Attorney, Agent, or Firm — Finch & Maloney PLLC

(57) ABSTRACT

Techniques are disclosed for aiding in charging an electronic device using a charging case. The charging case includes a conductive contact and may connect to a conductive contact of the electronic device while still allowing user access to the main connector port of the electronic device. The charging case includes a power module that may receive power from an external power source. The power module may include an inductive coupling coil, photovoltaic cells, or a power cable port. Circuitry within the charging case may control and transmit power from the power module to the electronic device through the conductive contacts. The charging case may include a battery. The charging case may also include a data module for receiving data from an external data source, and the case circuitry may process and transmit data from the data module to the electronic device through the conductive contacts.

7 Claims, 5 Drawing Sheets

CHARGING CASE FOR ELECTRONIC DEVICES

RELATED APPLICATIONS

This application is a divisional of U.S. application Ser. No. 13/941,479, filed on Jul. 13, 2013 which claims the benefit of U.S. Provisional Application Nos. 61/673,588 and 61/673,590, both filed on Jul. 19, 2012. Each of these applications is herein incorporated by reference in its entirety.

FIELD OF THE DISCLOSURE

This disclosure relates to charging electronic devices, and more particularly, to a device case for aiding in charging a device.

BACKGROUND

Electronic devices are present in various form factors, such as, tablets, cell phones, laptops, eBook readers, etc. Charging such electronic devices is necessary on a regular basis, and typically the devices are charged by a connection to the main connector port of the electronic device. Often, the main connector port is located at a bottom portion of the device such that it may stand upright while it is connected into a docking station.

DETAILED DESCRIPTION

Figure 1A:
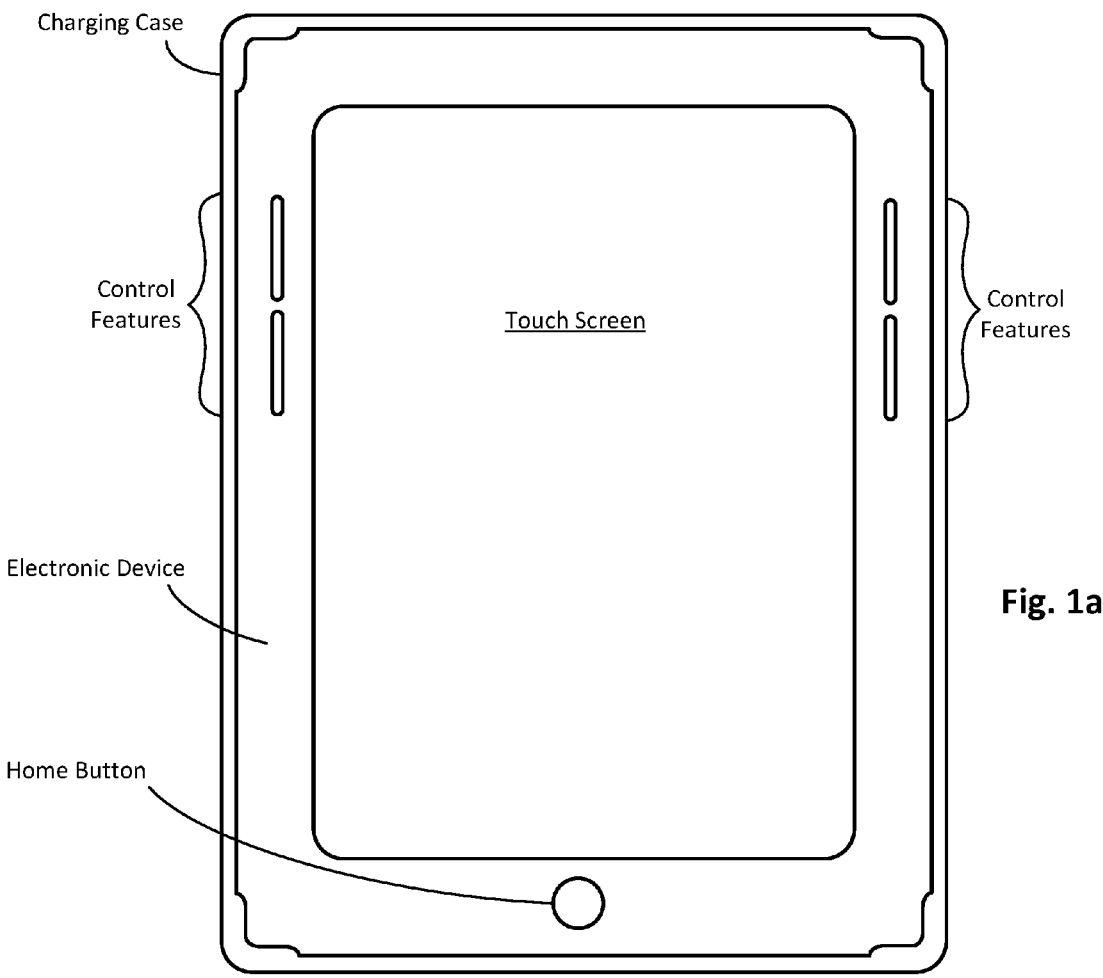
FIGS. 1a-b illustrate an example charging case surrounding an electronic touch screen device configured in accordance with an embodiment of the present invention.

Techniques are disclosed for aiding in charging an electronic device using a charging case. The charging case may attach to the outside of the electronic device and includes a conductive contact and may connect to a conductive contact of the electronic device while still allowing user access to the device's main connector port. Thus, the charging case may allow user access to the device's main connector port during charging. The charging case includes a power module that may receive power from an external power source. The power module may include, for example, an inductive coupling coil, photovoltaic cells, or a power cable port. Circuitry within the charging case may control and transmit power from the power module to the electronic device and may perform any necessary processing or conditioning before transmitting power through the conductive contacts. The charging case may include a battery that can act as a primary or backup battery for the electronic device. The charging case may also include a data module for receiving data from an external data source, and the case circuitry may process and transmit data to the electronic device through the conductive contacts. The data module may include, for example, a short range transponder, one or more data ports, or an inductive coupling coil.

General Overview

As previously explained, various charging techniques exist for powering electronic devices, but such techniques may prevent access to the main connector port during charging. The charging case and charging techniques described herein provide a more streamlined charging experience without occupying the device's main connector port. In one embodiment, the charging case includes a power receiver module, charging case circuitry, and a conductive contact for connecting the case to an electronic device. The power module of the charging case may receive power, for example, from an external power source, and the charging case circuitry may be configured to transfer a charge from the power module to the electronic device through the conductive contact. The charging case may charge the device's battery, in some embodiments, while in other embodiments the charging case may include its own battery that may act as a primary or back-up battery for the electronic device. In one such example, the charging case includes a battery that is configured to connect into the battery slot of the electronic device such that the case conductive contact connects to the device's battery contacts. The case may be, for example, a customized case configured to fit a specific electronic device model. The case may slide around the device like a sleeve, may snap around the edges of the device, may include a device screen protector, or have any other suitable case form factor that allows for access to the main connector port of the device. In one specific example, the case may include a flap that can cover the front of the device. In some cases, the flap may fold behind the device to function as a device stand, the flap may cause the device to enter sleep mode when covering the device screen, and it may wake the device up from sleep mode when the flap is opened.

The power receiver module of the charging case may be connected to an external power source, for example, through a standard charger connection (e.g., mini USB, micro USB, 8 pin, 16 pin, S20 pin, car adapter, etc.), through solar cells included on the charger case, through inductive or magnetic coupling with a charging pad or station, or through some other suitable power transfer technique. Additionally, the charging case may include a second set of conductive contacts that may be used to receive power from a charging station. Solar and/or inductive coupling charging may provide the device user with a wireless charging technique which does not require a direct electrical connection with a charging station.

In one embodiment, the power module of the charging case includes a secondary conductor coil, and a primary conductor within a charging pad may be inductively/magnetically coupled with the charging case's secondary coil. In such an example, a current flow through the primary coil creates an electromagnetically induced voltage across the secondary coil. In one such example, placing the coils along a common axis such that the magnetic field created by the primary coil passes through the secondary coil may enhance the inductive coupling. The charging pad may include multiple primary inductive coupling coils, in some embodiments, and when the device case is placed on the charging pad the coil closes to the axis of the case's secondary coil may be activated. The charging circuitry of the charging case may then transfer the electromagnetically induced power from the conductor coil to the electronic device through the case's conductive contact. Inductive charging may be implemented using any standard or proprietary wireless charging interface. For example, inductive charging may be implemented using the Qi wireless charging interface standard developed by the Wireless Power Consortium and may have a power transfer range of up to 4 cm, in some embodiments. In other embodiments, the effective power transfer range may be as small as 5 mm.

In another embodiment, the power module of the charging case may include an array of photovoltaic cells that may be placed along the outside of the device case to collect solar power. In such an embodiment, the charging case circuitry may charge the electronic device through the conductive contacts without the need for a wire, and without needing to set the charging case on a specific charging pad or docking station. In one embodiment, the back of the charging case may be covered with photovoltaic cells because it may have the greatest unused and exposed surface area on the case. In another embodiment, photovoltaic cells may be placed on the front of the charging case around one or more edges of the device screen, or on any other unused and exposed surface of the device case.

The charging case may further include a data module, in some embodiments, that allows for additional data transfer to the electronic device through the charging case. In one such example, the charging case may include a short-range transponder or one or more data ports (e.g., Ethernet, WiFi, mini USB, micro USB, SD card, etc.), which allow for data transfer in addition to the device's main connector port. In one particular example, a near field communication (NFC) link may be used to transfer data to or from an electronic device through the charging case's circuitry. In some embodiments, the data module and the power module may utilize common circuitry for receiving power and data. For example, inductive coupling may be used for data transfer in addition to creating a charge source for the electronic device. In such an example, the charger case includes a conductor coil that may be magnetically coupled to an external conductor coil, and any change in current flow through the external conductor coil may be detected at the charger case's coil. The current flow data may be communicated to the electronic device through the case's conductive contacts, thus transferring data to the electronic device through inductive/magnetic coupling. When data is not being transferred via inductive coupling, the conductor coils may be used for charging the electronic device.

Charging Case Examples

Figure 1B:
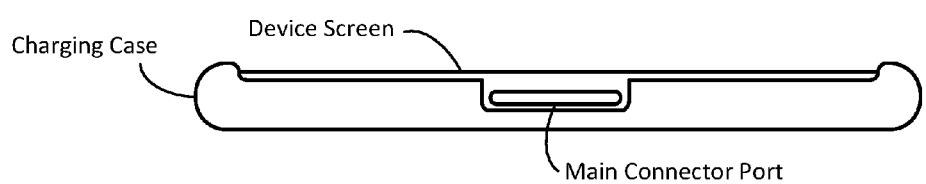

FIGS. 1a-b illustrate an example charging case surrounding an electronic touch screen device configured in accordance with an embodiment of the present invention. As can be seen, in this particular example the charging case can snap around the four corners of the electronic device and the case includes a device port access that allows for access to the device's main connector port. In this example embodiment, the device screen is a touch screen display and the device could be, for example, a tablet such as the NOOK® tablet or eReader by Barnes & Noble. In a more general sense, the device may be any mobile electronic device, such as a mobile phone, laptop, tablet, eBook reader, GPS system, etc. As will be appreciated in light of this disclosure, the claimed invention is not intended to be limited to any specific kind or type of electronic device or form factor.

In this example configuration, the charging case leaves the front of the electronic device completely accessible to the user. Thus, the conductive contacts of the charging case must connect to the electronic device through conductive contacts on the back of the device, and this connection will be discussed in reference to FIG. 2. In this specific example, the electronic device includes a number of control features and a press-button (sometimes called a home button herein). The hardware control features provided on the device in this example embodiment are configured as elongated press-bars and can be used, for example, to page forward (using the top press-bar) or to page backward (using the bottom press-bar), such as might be useful in an eReader application. In this example configuration, the home button is a physical press-button that may be associated with and control numerous device actions, such as, showing a navigation menu, exiting a navigation menu, putting the device to sleep, etc. Other embodiments may have fewer or additional such control features, or different control features altogether, depending on the target application of the device, and the charging case may be configured so as to not interfere with a user's access to these control features. Any such general controls and features can be implemented using any suitable conventional or custom technology, as will be appreciated. In some specific example embodiments, the charging case may be attached to an electronic device measuring about 7" to 9" high by about 5" to 6" wide by about 0.5" thick, and weighing about 7 to 8 ounces. Any number of suitable form factors can be used, depending on the target application (e.g., laptop, mobile phone, GPS unit, etc.). The charging case may be smaller, for example, for smartphone and tablet applications and larger for laptop applications.

Figure 2:
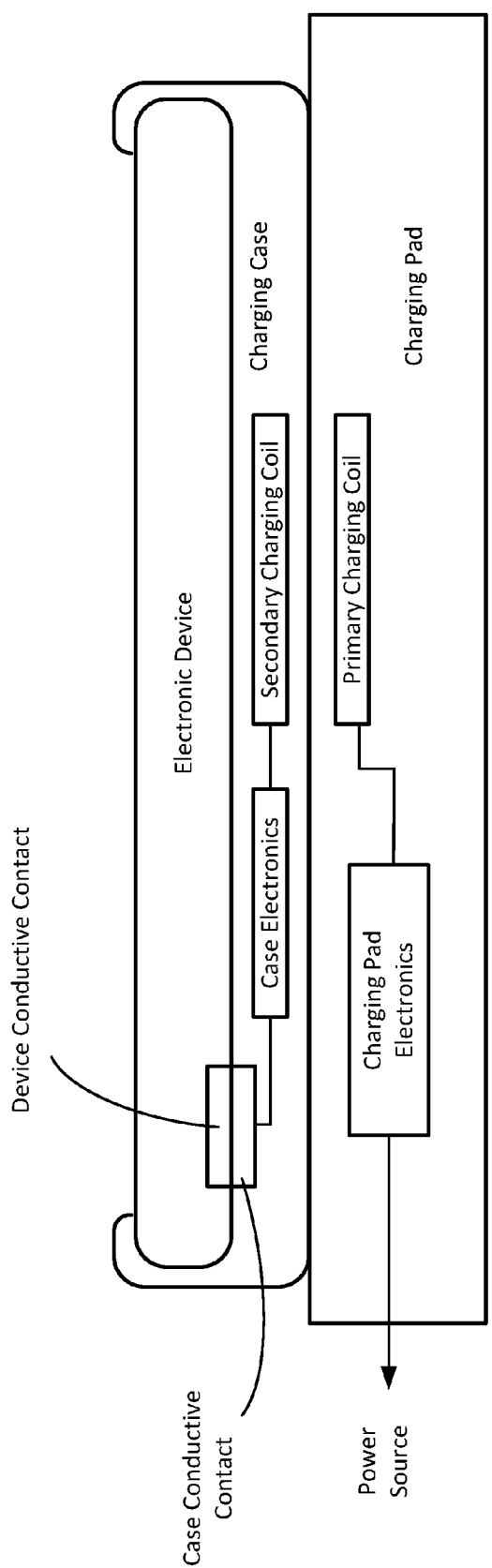
FIG. 2 illustrates a cross-sectional view of an inductively coupled charging case for an electronic device, configured in accordance with an embodiment of the present invention.

FIG. 2 illustrates a cross-sectional view of an inductively coupled charging case for an electronic device, configured in accordance with an embodiment of the present invention. As can be seen, this example charging case includes case electronics that are connected with a case conductive contact as well as a secondary charging coil. The electronic device is fixed within the charging case, and the device conductive contact is in physical contact with the charging case's conductive contact. The charging case is lying on top of a charging pad, which includes charging pad electronics that are connected to a primary charging coil, as well as an external power source, such as a 120V AC power outlet, for example. In this specific example, the charging pad electronics provide a current to the primary charging coil from the external power source, and the current flowing through the primary charging coil may create a magnetic field. This magnetic field is detected by the secondary charging coil, and causes an electromagnetically induced voltage across the secondary charging coil. The case electronics may then transfer this voltage to the electronic device through the case's conductive contact. In one embodiment, the secondary charging coil is located along the same axis as the primary charging coil, such that the magnetic field created by the primary coil passes through the center of the secondary coil, enhancing the inductive coupling. As discussed above, inductive charging may be implemented using any standard or proprietary wireless charging interface (e.g., the Qi wireless charging interface standard developed by the Wireless Power Consortium). The charging pad electronics may also include, for example, a processor that is configured to control the current flow through the primary charging coil. In such an embodiment, a change in current through the primary charging coil will induce a change in voltage across the secondary coil and this change in voltage may be detected and processed by the case electronics. Thus, by regulating the current flow through the primary charging coil using the processor, data may be communicated to the charging case through inductive coupling. In such an example, inductive coupling circuitry may be used to communicate data to the device and charge the device through the charging case.

Figure 3:
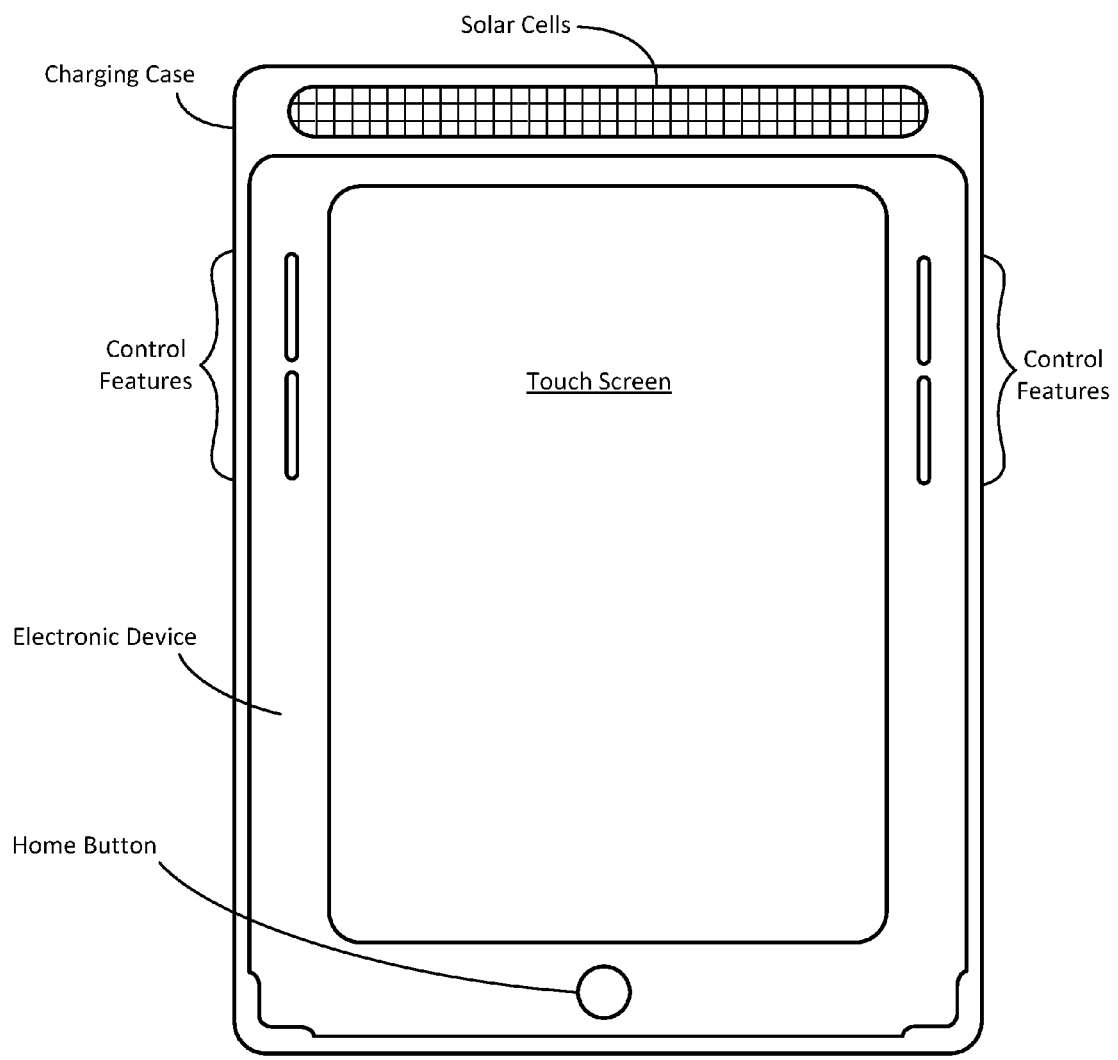
FIG. 3 shows a solar powered charging case for an electronic device, configured in accordance with an embodiment of the present invention.

FIG. 3 shows a solar powered charging case for an electronic device, configured in accordance with an embodiment of the present invention. As can be seen, in this particular example the charging case can snap around the outer edge of the electronic device, leaving the front of the electronic device completely accessible to the user. In this example embodiment, the device screen is a touch screen display and the device includes a number of control features and a press-button (sometimes called a home button herein). As discussed above, the hardware control features provided on the device in this example embodiment are configured as elongated press-bars and the home button is a physical press-button that may be associated with and control numerous device actions. Other embodiments may have fewer or additional such control features, or different control features altogether, depending on the target application of the device, and the charging case may be configured so as to not interfere with a user's access to these control features. In this particular example, the charging case includes an array of photovoltaic cells built into the case that can use solar power to charge the device battery. The cells are placed on the front of the charging case around the top border, in this particular example, such that they will not interfere with the user's view of the device screen. In other embodiments, photovoltaic cells may be placed on the back of the electronic device, or on any other unused and exposed surface of the device case.

Architecture

Figure 4:
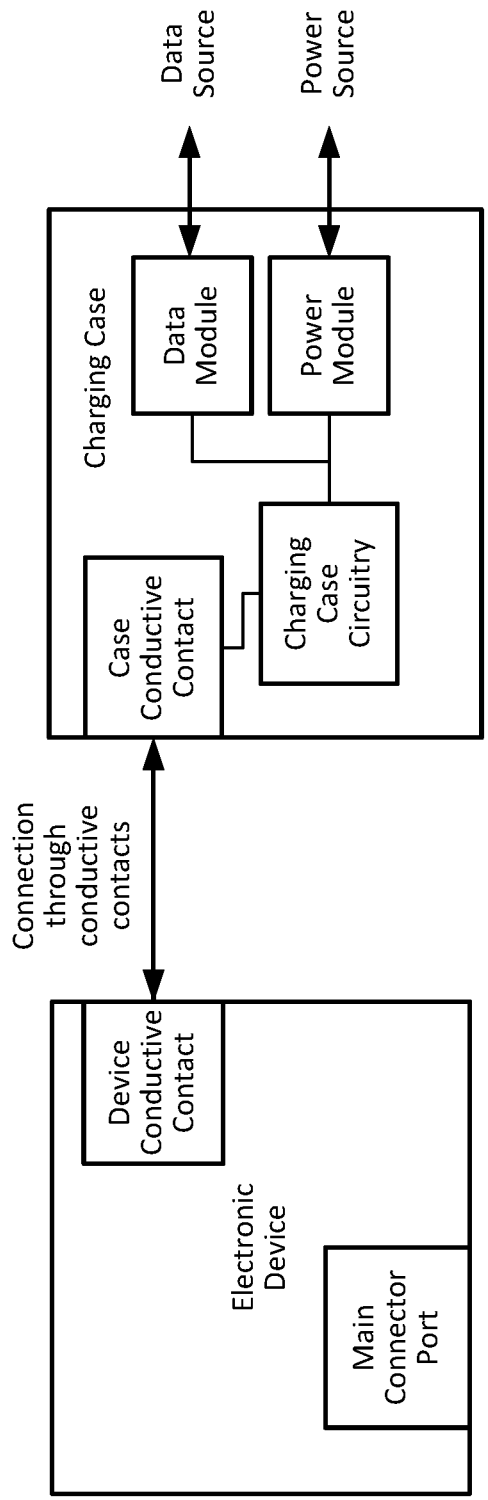
FIG. 4 illustrates a block diagram of a charging case connected to an electronic device, configured in accordance with an embodiment of the present invention.

FIG. 4 illustrates a block diagram of a charging case connected to an electronic device, configured in accordance with an embodiment of the present invention. As can be seen, the system generally includes a charging case that is capable of connecting to an electronic device through conductive contacts. In this example case, the electronic device includes a conductive contact point, as well as a main connector port. The charging case connects at the conductive contacts so as to leave the main connector port accessible while the charging case is connected. As can be seen, the charging case includes a conductive contact point, charging case circuitry, a power module, and a data module, in this particular embodiment. The power module and data module may be connected to external power and data sources. In some embodiments, the power source may include a cable, an inductive charging coil, a light source, or any other source of power that a power module may collect power from. The power module may include, for example, a secondary inductive coil similar to the one described in FIG. 2, an array of photovoltaic cells, a cable port, one or more conductive contacts, or some other module for collecting power. The data module may include, for example, NFC circuitry, a short-range transponder, a data port (e.g., Ethernet, WiFi, mini USB, micro USB, SD card, etc.) that allows for data transfer in addition to the device's main connector port, or an inductive coil configured to receive data from an external inductively coupled data source. In some embodiments, the power and data modules can be implemented with common circuitry in a single module, and the data and power may be transmitted through the same external data and power source. For example, in one embodiment, inductive coupling may be used to transmit power and data to the charging case. The charging case circuitry may include, for example, a linear regulator, bridge rectifier, inductive transponder circuitry, or any other necessary circuitry for processing or conditioning data or power before transferring it to the electronic device through the conductive contacts.

Methodology

Figure 5:
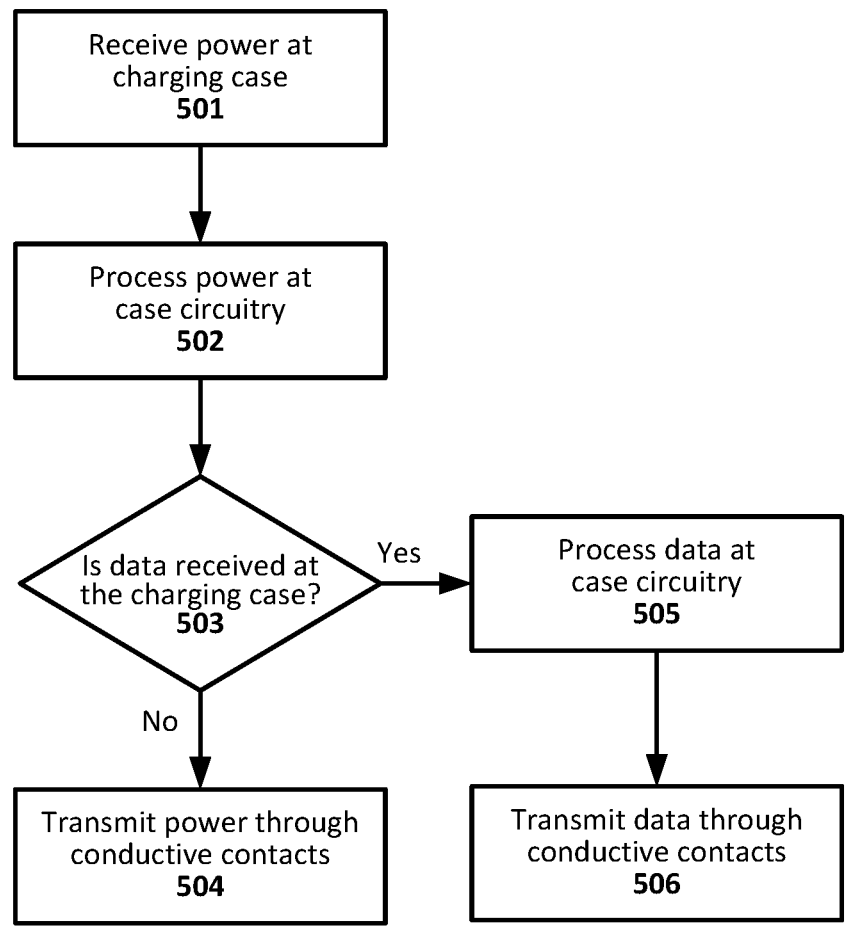
FIG. 5 illustrates a method for aiding in charging a device using a charging case, in accordance with an embodiment of the present invention.

FIG. 5 illustrates a method for aiding in charging a device using a charging case, in accordance with an embodiment of the present invention. In one example embodiment, the elements of the following method may be carried out on the various system modules described in reference to FIG. 4. As can be seen, in this example case, the method starts by receiving 501 power at the charging case from an external power source. The power may be received by the power module of FIG. 4, and as discussed above, the power module may include photovoltaic cells, a power cable port, inductive charging coils, etc. The method may continue with processing 502 the power at the charging case circuitry. The circuitry may be used to control and/or condition any power received from the power module before transferring it to the electronic device, and the power may be processed by the charging case circuitry of FIG. 4. The processing may include, for example, rectification, filtering, and regulating, or any other suitable power conditioning processes. The method may continue with determining 503 whether data is received at the charging case. The data may be received by the data module of FIG. 4 and the data module may include one or more data ports, an inductive coupling coil, a short-range transponder, or any other suitable data reception module. If no data is received at the charging case, the method may continue with transmitting 504 power through the conductive contacts to the electronic device. The conductive contacts of FIG. 4 may be used to transmit the power from the charging case to the electronic device. If data is received at the charging case, the method may continue with processing 505 the data at the charging case circuitry. The data processing may be performed by the charging case circuitry of FIG. 4. In some embodiments, the circuitry may perform preliminary processing of the data received at the charging case before transmitting the data to the electronic device. The method may continue with transmitting 506 the data to the electronic device through the conductive contacts. The conductive contacts of FIG. 4 may be used to transmit data from the charging case to the electronic device.

Numerous variations and embodiments will be apparent in light of this disclosure. One example embodiment of the present invention provides an electronics case including a conductive contact configured to connect to a conductive contact on an electronic device. The electronics case also includes a power module configured to receive power from an external power source, as well as charging case circuitry configured to transfer power from the power module to an electronic device through the conductive contact, thereby leaving a main connector port of the electronic device available for use during charging of the device via the case. In some cases, the electronics case further includes a device port access configured to allow access to the main connector port of the electronic device. In some cases, the electronics case further includes a data module configured to receive data from an external data source and transfer data to an electronic device through the conductive contact. In some such cases, the data module includes an inductive coil, and is configured to send and receive data through inductive coupling. In other such cases, the data module includes at least one of an: NFC circuit, Ethernet port, WiFi circuit, mini USB port, micro USB port, and/or SD card port. In some cases, the power module includes at least one of: photovoltaic cells, an inductive coil configured to electromagnetically couple to a primary inductive charging coil, a set of conductive contacts, and/or a charging cable port. In some cases, the electronics case further includes a battery configured to receive a charge from the power module and connect into the battery slot of the electronic device. In some cases, the electronic device is a mobile phone, laptop, tablet, eBook reader, or GPS device.

Another example embodiment of the present invention provides an electronics case including a conductive contact configured to connect to a conductive contact of an electronic device. The electronics case also includes a power and data module configured to receive power and data from an external power source using common circuitry, and charging case circuitry configured to transfer power and data from the power and data module to an electronic device through the conductive contact, thereby leaving a main connector port of the electronic device available for use during charging of the device via the case. In some cases, the power and data module includes an inductive coil configured to wirelessly power the electronic device through inductive coupling, and further configured to send and receive data through inductive coupling. In some cases, the power and data module includes at least one of an: NFC circuit, Ethernet port, WiFi circuit, mini USB port, micro USB port, and/or SD card port. In some cases, the electronic device is a mobile phone, laptop, tablet, eBook reader, or GPS device. In some cases, the electronics case further includes a battery configured to receive a charge from the power module and connect into the battery slot of the electronic device.

Another example embodiment of the present invention provides a system for charging an electronic device including a charging pad comprising a primary inductive coupling circuit. The system also includes a charging case configured to connect with the electronic device through a conductive contact, thereby leaving a main connector port of the electronic device available for use during charging of the device via the case. The case includes a secondary inductive coupling circuit configured to receive power from the primary inductive coupling circuit, and charging case circuitry configured to control power transfer from the secondary inductive coupling circuit to the electronic device through the conductive contact. In some cases, the system further includes a processor within the charging pad configured to transfer data by regulating the current flow through the primary inductive coupling circuit, and wherein the secondary inductive coupling circuit is further configured to receive data from the primary inductive coupling circuit. In some cases, the charging case circuitry is further configured to perform power conditioning and/or preliminary data processing prior to transferring power and/or data to the electronic device through the conductive contact. In some cases, the system further includes a battery within the charging case configured to receive power from the secondary inductive coupling circuit. In some cases, the primary inductive coupling circuit includes a plurality of inductive coupling coils, and wherein a coil closest to the axis of the secondary inductive coupling circuit is used to transfer power and/or data to the secondary inductive coupling circuit. In some cases, the charging case further includes at least one of an: NFC circuit, Ethernet port, WiFi circuit, mini USB port, micro USB port, and/or SD card port. In some cases, the charging case circuitry is further configured to transfer data to the primary inductive coupling circuit of the charging pad by regulating a current through the secondary inductive coupling circuit.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for charging an electronic device, comprising:
   a charging pad comprising a primary inductive coupling circuit; and
   a charging case configured to connect with the electronic device through a conductive contact, thereby leaving a main connector port of the electronic device available for use during charging of the device via the case, the case comprising:
      a secondary inductive coupling circuit configured to receive power from the primary inductive coupling circuit; and
      charging case circuitry configured to control power transfer from the secondary inductive coupling circuit to the electronic device through the conductive contact.

2. The system of claim 1 further comprising a processor within the charging pad configured to transfer data by regulating the current flow through the primary inductive coupling circuit, and wherein the secondary inductive coupling circuit is further configured to receive data from the primary inductive coupling circuit.

3. The system of claim 2 wherein the charging case circuitry is further configured to perform power conditioning and/or preliminary data processing prior to transferring power and/or data to the electronic device through the conductive contact.

4. The system of claim 1 further comprising a battery within the charging case configured to receive power from the secondary inductive coupling circuit.

5. The system of claim 1 wherein the primary inductive coupling circuit comprises a plurality of inductive coupling coils, and wherein a coil closest to the axis of the secondary inductive coupling circuit is used to transfer power and/or data to the secondary inductive coupling circuit.

6. The system of claim 1 wherein the charging case further comprises at least one of an: NFC circuit, Ethernet port, WiFi circuit, mini USB port, micro USB port, and/or SD card port.

7. The system of claim 1 wherein the charging case circuitry is further configured to transfer data to the primary inductive coupling circuit of the charging pad by regulating a current through the secondary inductive coupling circuit.

* * * * *